US010430791B2

(12) United States Patent
Sancak et al.

(10) Patent No.: US 10,430,791 B2
(45) Date of Patent: Oct. 1, 2019

(54) BIOMETRIC SECURE SALES AND PAYMENT TERMINAL USING FACE RECOGNITION AND FINGER PRINT DEFINITION METHODS

(71) Applicant: MT BILGI TEKNOLOJILERI VE DIS TICARET A.Ş., Istanbul (TR)

(72) Inventors: Murat Sancak, Istanbul (TR); Aydin Celik, Istanbul (TR)

(73) Assignee: MT BILGI TEKNOLOJILERI VE DIS TICARET A. S., Istanbul (TR)

( * ) Notice: Subject to any disclaimer, the term of this patent is extended or adjusted under 35 U.S.C. 154(b) by 434 days.

(21) Appl. No.: 15/328,019

(22) PCT Filed: Jul. 10, 2015

(86) PCT No.: PCT/TR2015/050030
§ 371 (c)(1),
(2) Date: Jan. 21, 2017

(87) PCT Pub. No.: WO2016/013999
PCT Pub. Date: Jan. 28, 2016

(65) Prior Publication Data
US 2017/0178141 A1    Jun. 22, 2017

(30) Foreign Application Priority Data
Jul. 22, 2014   (TR) ................................. 2014 08608

(51) Int. Cl.
*G06Q 20/40*   (2012.01)
*G06Q 20/34*   (2012.01)
(Continued)

(52) U.S. Cl.
CPC ..... *G06Q 20/40145* (2013.01); *G06Q 20/207* (2013.01); *G06Q 20/209* (2013.01);
(Continued)

(58) Field of Classification Search
CPC .. G06Q 20/207; G06Q 20/209; G06Q 20/325; G06Q 20/341; G06Q 20/4012;
(Continued)

(56) References Cited

U.S. PATENT DOCUMENTS

| 6,424,249 B1 | 7/2002 | Houvener |
| 7,039,221 B1 | 5/2006 | Tumey et al. |

(Continued)

FOREIGN PATENT DOCUMENTS

| GB | 2501318 A | 10/2013 |
| TR | 201005102 U | 8/2010 |

(Continued)

OTHER PUBLICATIONS

E R P IN, "How PES Cam works 3 X X I I O O", Sep. 29, 2015, XP055225338, Retrieved from the Internet: URL: http://www.worldpay.com/sites/default/files/WPUK-how-cam-works.pdf [retrieved on Nov. 3, 2015] the whole document.

*Primary Examiner* — Yong Hang Jiang
(74) *Attorney, Agent, or Firm* — Gokalp Bayramoglu

(57) ABSTRACT

This invention is related to a secure sales and payment terminal where payment is carried out using methods such as biometric definition and fingerprint definition. Definition of the biometric face data and/or fingerprints of the user, carrying out secure payment via a bank, printing the payment details on a slip, submitting an electronic slip to the e-mail address of the customer, forming accounting records and storing all procedures carried out on the terminal (1) is performed by means of the invention.

9 Claims, 2 Drawing Sheets

(51) Int. Cl.
  *G06Q 20/20*  (2012.01)
  *G06Q 20/32*  (2012.01)
  *G07F 7/08*  (2006.01)
  *G07F 7/10*  (2006.01)

(52) U.S. Cl.
  CPC ......... *G06Q 20/325* (2013.01); *G06Q 20/341* (2013.01); *G06Q 20/4012* (2013.01); *G07F 7/0886* (2013.01); *G07F 7/1025* (2013.01)

(58) Field of Classification Search
  CPC ............ G06Q 20/40145; G07F 7/0886; G07F 7/1025
  See application file for complete search history.

(56) References Cited

U.S. PATENT DOCUMENTS

| | | | |
|---|---|---|---|
| 7,287,850 B2* | 10/2007 | Matsui | B41J 3/36 |
| | | | 347/108 |
| 8,577,810 B1 | 11/2013 | Dalit et al. | |
| 9,679,166 B2* | 6/2017 | Yasutomi | G06F 21/86 |
| 2002/0087478 A1 | 7/2002 | Hudd et al. | |
| 2007/0038565 A1* | 2/2007 | Bartz | G06Q 20/105 |
| | | | 705/41 |
| 2012/0321147 A1 | 12/2012 | Kamiya | |
| 2014/0183260 A1 | 7/2014 | Sancak | |

FOREIGN PATENT DOCUMENTS

| WO | WO0186599 A2 | 11/2001 |
|---|---|---|
| WO | WO2005008446 A2 | 1/2005 |

\* cited by examiner

BIOMETRIC SECURE SALES AND PAYMENT TERMINAL USING FACE RECOGNITION AND FINGER PRINT DEFINITION METHODS

CROSS REFERENCE TO RELATED APPLICATIONS

This application is the national phase entry of International Application No. PCT/TR2015/050030, filed on Jul. 10, 2015, which claims priority to turkish application 2014/08608, filed on Jul. 22, 2014, the entire contents of which are incorporated herein by reference.

TECHNICAL FIELD

This invention is related to a secure sales and payment terminal where payment carried out using methods such as biometric definition and fingerprint definition. Definition of the biometric face data and/or fingerprints of the user, carrying out secure payment via a bank, printing the payment details on a slip, storing the information on the Electronic Recording Unit (EKU) up to ten years and being able to retrieve the copies if necessary, submitting, an electronic slip to the e-mail address of the customer, forming accounting records and storing all procedures carried out on the terminal is performed by means of the invention

BACKGROUND OF THE INVENTION

Payment methods used nowadays vary. Different types of devices are used regarding payment methods. Cash registers or cash till POS machines related to portable EFT/POS devices can be given as examples. Cash till POS machines, are electronic devices used in preparing receivables or cash payment slips in all kinds of goods and services fields by taking the card and identification documents that are found on the magnetic bands of credit cards and bank cards, chips or similar technological devices as basis. Cash till POS devices are connected to a GSM or telephone line, wherein the credit card information is submitted to the credit card information centre via GSM or a telephone line.

The user needs to enter a passcode/pin number in order to provide communication between the cash till POS device and the bank. In order to provide security, payment information may be sent to the mobile phone of the user. Moreover some smart contactless cards are used nowadays. These cards enable easier usage without entering a passcode. In these points where feasibility is tried to be provided various security flaws may occur. In the case that the card is stolen by a third party/person and/or if the pass code is known by a third person, unfortunately payment may be made against the will of the owner of the card.

In the same way, in the case that the bank or credit card is stolen, online shopping can be easily carried out using the information given on the front and back of the card. It is very difficult in today's technology to trace the person who has shopped online.

Various systems have been developed in order to prevent situations which may constitute fraud. The WO2005008446 document within the known state of the art describes a payment system developed, which is carried out without using cash. In this system, various biometric systems such as finger print, face definition etc are combined with a typical credit card structure via magnetic bands. However in this system billing carried out by a cash register or financial procedures are not described.

In the Turkish Utility Model application numbered TR201005102 within the known state of the art, a contact, contactless credit card, touch screen or keyboard cash register POS is provided. The invention is related to a device used in businesses with commercial activities, where a plurality of units (eft-pos terminal, pin pad, financial electronic cash register, barcode reader and a GPS based position finding device) which are physically independent from each other at the same spot are assembled as a single unit having a compact structure. However in this application biometric definition is not described.

SUMMARY OF THE INVENTION

The aim of this invention is to provide a secure sales and payment terminal using biometric security systems such as fingerprint and face recognition while carrying out payments with a bank/credit card. Another aim of this invention is to provide a biometric secure sales and payment terminal where the accounting records and financial procedures are carried out automatically. Another aim of the invention is to provide a biometric secure sales and payment terminal where information receipts such as an information slip and electronic bill is given.

BRIEF DESCRIPTION OF THE DRAWINGS

The biometric secure sales and payment terminal using face recognition and fingerprint recognition methods, provided in order to reach the aims of the invention has been illustrated in the attached figures.

According to these figures.

Figure 1:
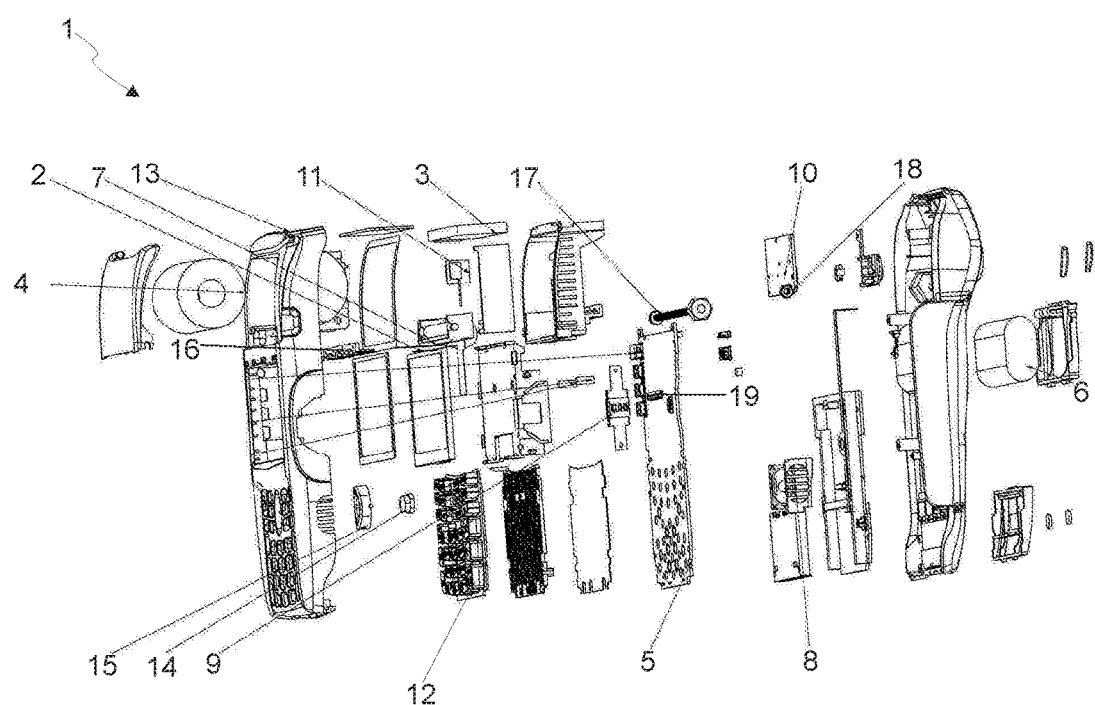
FIG. 1 Is the blown up view of the biometric secure sales and payment terminal using face recognition and fingerprint recognition methods subject to the invention.
Figure 2:
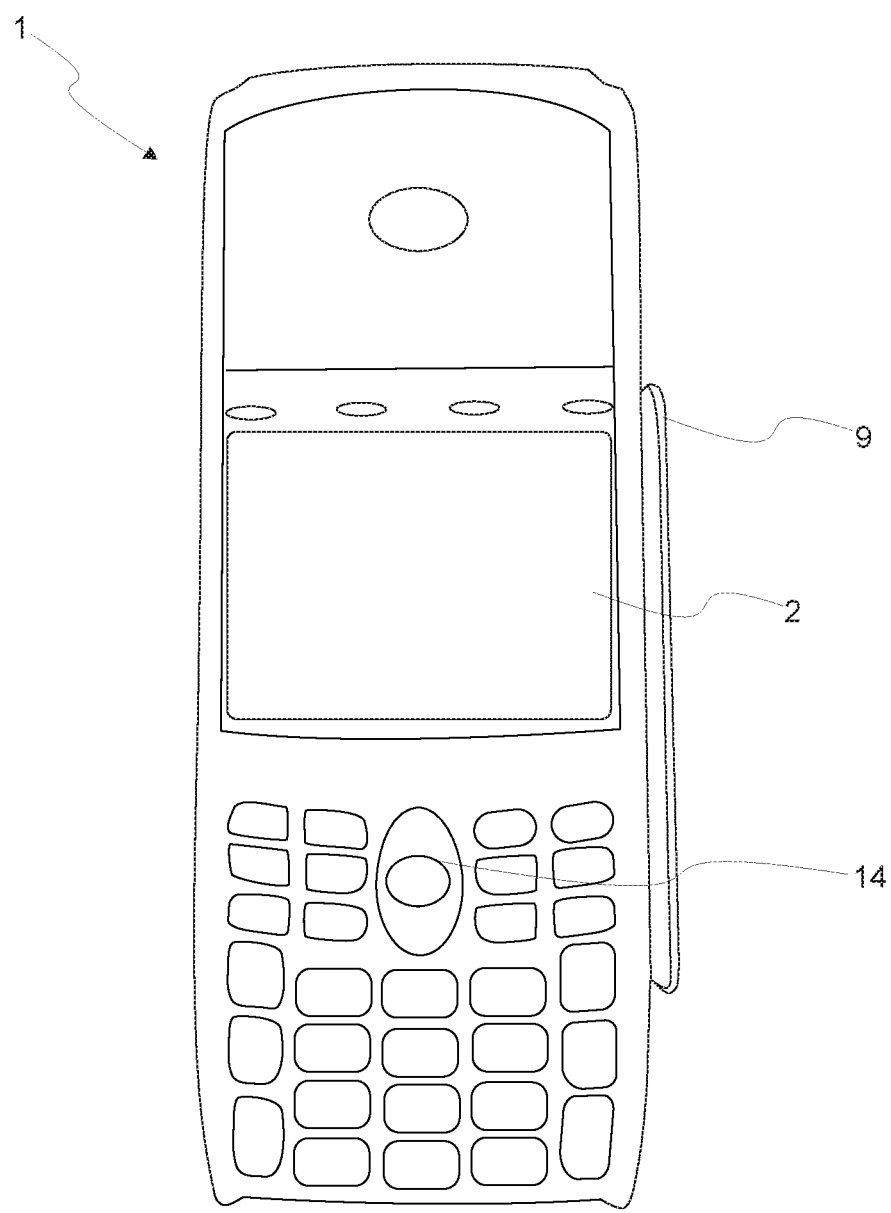
FIG. 2 Is another view of the biometric secure sales and payment terminal using face recognition and fingerprint recognition methods subject to the invention.

The biometric secure sales and payment terminal using face recognition and fingerprint recognition methods subject to the invention has been numbered as below in the attached figures.

1. Secure sakes and payment terminal
2. TFT user screen
3. Customer screen
4. Paper roll
5. Motherboard
6. Battery
7. Thermal printer
8. Speaker
9. Magnetic card reader
10. Camera
11. GSM Antenna.
12. Keyboard
13. Top cover
14. Menu key
15. Direction key
16. Contactless reader
17. Financial stamp screw
18. Financial stamp screw slot
19. Program
20. Financial memory module
21. Internal electronic recording unit (EKU)
22. Fingerprint reader
23. Chip card reader
24. GPS antenna
25. Charge module
26. External EKU

DETAILED DESCRIPTION OF THE INVENTION

The biometric secure sales and payment terminal (1) using face recognition and fingerprint recognition methods subject to the invention comprises;

An electronic TFT screen (2) which displays the transactions carried out by the user, A customer screen (3) where the customer can see information such as expenses, costs etc., A paper roll (4) on which the payment information of the customer is printed, A motherboard (5) which arranges the system algorithm (operation principle), stores the program as digital and analogue data, and compares the fingerprint and/or face recognition data by communicating with the bank, A battery (6) which enables the transactions to be carried out by providing power to the terminal when there is no mains electricity, A thermal printer (7) which prints the information slips such as sales, payment, report receipts on a paper roll (4), A speaker (8) which enables the customer and the user to hear the transactions carried out, A card reader (9) where the card contact is physically carried out, and the card is magnetically read, A camera (10) located on the terminal, which captures the face image of the customer and submits the face information to the motherboard so that it can be compared with the face data of the bank, A GSM antenna (11) which carries out data flow with the base station, and by this means, enables the communication of the terminal (1) with the necessary posts, A keyboard (12) which enables the transactions to be carried out on the terminal (1) by the user, A top cover (13) which protects the terminal (1) from impact that may be received from the top, A menu key (14) that is used to reach the desired options within the program (19), A direction key (15) which provides easy manoeuvring within the menu with which transactions can be carried out faster and easier, A contactless reader (16) which can read the card having contactless characteristics, financial stamp screw (17) which shows that access into the secure sales and payment terminal (1) is performed by leaving a mark in the case that the secure sales and payment terminal (1) is tampered, A financial stamp screw slot (18) which enables the attachment of the financial stamp screw (17), A program (19), which is loaded into the memory within the motherboard (5) and manages the communication between all of the analogue and digital parts within the secure sales and payment terminal (1), A micro processor secure financial memory module (20) which erases the daily total sales and total VAT amount inside the secure sales and payment terminal (1) and stores them in a secure state which cannot be changed and which is in compliance with the financial cash register technical specification, An internal EKU (21) which is an electronic record unit where all the copies of all transactions carried out on the secure sales and payment terminal are recorded therein.

A fingerprint reader (22) where the user can move between menus in a faster and easier way instead of using the menu key (14) and the direction key (15) located on the secure sales and payment terminal (1); which also recognizes the user, A chip card reader (23) which is located on the secure sales and payment terminal (1) and which can read the information of the customer loaded inside the chip found on the bank/credit card, A GPS antenna (24) which communicates with a satellite, and aids in determining the position of the secure sales and payment terminal (1), A charger module (25) which enables the charging of the terminal (1) by means of an external device, without the need for a cable to be attached to the secure sales and payment terminal (1), An external EKU (26) located inside the top cover which can be changed when the memory is full, into which all the copies of the printed information belonging to all transactions carried out by the secure sales and payment terminal (1) is stored.

Nowadays the payments during the sales transactions carried out without using cash, are performed by bank/credit cards. Cash register POS terminals are known, which can read these cards magnetically, via chips or as contactless cards. Cash register POS terminals and said card systems have security flaws. These security flaws can be prevented by a biometric secure sales and payment terminal using face recognition and finger print definition methods.

The person using a secure sales and payment terminal (1) can carry out and observe procedures such as determining the payment to be made, the amount of payment installments, performing system settings of said secure sales and payment terminal (1), printing receipts, taking reports by using the keyboard (12) and the TFT screen (2). Transactions are carried out by the user by easily observing said transactions by means of this screen (2). A second screen located on the secure sales and payment terminal (1) is the customer screen (3) where the customer can see the payment amount.

The secure sales and payment terminal (1) can be used as a mobile device. When it is used during a mains electricity power cut or sales and payment is performed at a place without electricity, the battery of the device lasts for a long time and it enables easier usage.

A thermal printer (7) is located on the secure sales and payment terminal (1) which can print the sales, payment information, reports and information documents on a paper roll (4). By means of the printer, documents such as receipts, bills and reports can be physically kept as records.

A keypad is needed in order to be able to use the secure sales and payment terminal (1). This keypad is formed from a keyboard (12) and a menu key (14). The controlling of the secure sales and payment terminal (1) and the transactions to be carried out are determined by navigating within the program (19) by means of the keyboard (12), menu key (14) and direction key (15).

A speaker (8) is provided which announces the transactions carried out to the customer and the user and said speaker is located on the secure sales and payment terminal (1).

A physical contact is necessary in order for the bank/credit card to be read by the terminal (1) by standard methods. In the case that security cannot be provided using biometric definition and finger print definition methods, the card is read via the magnetic card reader (9) or chip card reader (23) located on the terminal. Security methods such as entering a password, and showing identification similar to the methods of present systems can be carried out by means of this standard method. The card information can be read without the need for the card to be in contact with the terminal, by means of the contactless reader (16).

In the case that the secure sales and payment terminal (1) is online, or in other words data communication can be carried out with the bank, the image of the customer's face can be captured via the camera (10) located on the secure sales and payment terminal (1). The camera (10) submits the captured image to the motherboard (5). At this moment the bank defines the customer by means of the chip of the card/credit card placed into the secure sales and payment terminal (1) and submits the face recognition information of the customer to the motherboard (5) of the secure sales and payment terminal (1) via the interact, 3G or any other kind of communication protocol. The secure sales and payment terminal (1) motherboard matches the face image it has captured from the camera (10) and the former face information that has been defined before hand, obtained from the bank. If the matching is positive the payment is carried out. If the faces cannot be matched, payment will not be carried out and the secure sales and payment terminal (1) requests a password/pin information from the customer. The payment can be performed after the customer enters the password/pin information. The face that cannot be defined in terms of security according to a negative scenario, can be sent to authorized organizations.

By this means, the customer can request the face image submitted to the authorized organizations and posts if the bank card has been used by a third person and can define the third person that has used the card or can use it as proof.

In the case that the secure sales and payment terminal (1) is offline, or in other words if data communication cannot be performed with the bank, directly a standard method is applied in order to carry out payment. The bank/credit card is placed into the secure sales and payment terminal (1), the payment to be performed is entered by the user (workplace) and the terminal requests pass code/pin information. The payment can then only be performed after the customer enters the pass code/pin information.

A sim or sam card is placed into the secure sales and payment terminal (1) having the user (workplace) information. The sim or sam card, can communicate with the necessary posts (bank, finance organizations, ministry of finance) via an Ethernet card, GSM antenna (11) and satellite. By means of this communication information can be obtained by authorized posts. Said information may comprise customer identification information, customer fingerprint information, security information such as customer biometric face information, product that has been bought, stock information, and financial information such as tax information.

The secure sales and payment terminal (1) can be used in two different ways according to preference. Ease of use is provided by means of the menu key (14) and direction key (15). The second application is able to install the finger print reader (22) to the terminal instead of the menu key (14) and the direction key (15).

In the case that the secure sales and payment terminal (1) is online, or in other words data communication can be performed with the bank, the customer can carry out payment with his/her own fingerprint. The fingerprint information of the customer is obtained by means of the fingerprint reader (22) located on the secure sales and payment terminal (1). The fingerprint reader (22) submits the information it has obtained to the motherboard (5). At this moment the bank defines the customer by means of the chip of the bank card/credit card that is placed into the terminal (1) and submits the fingerprint information to the motherboard (5) of the terminal via the interact, 3G or any other kind of communication protocol. The motherboard (5) of the terminal (1) matches the former fingerprint information it has obtained from the bank with fingerprint information it has obtained from the fingerprint reader (22). If the matching is positive, then the payment will be carried out. If the matching is negative the terminal (1) shall request the pass code/pin information from the customer. The payment is performed after the customer enters the pass code/pin information. The fingerprint that cannot be defined in terms of security in a negative scenario, shall be able to be submitted to the authorized posts.

By this means, the customer can request the fingerprint submitted to the authorized organizations and posts if the back card has been used by a third person and can define the third person that has used the card or can use it as proof.

The customer needs to define his/her fingerprint and face at the bank beforehand. If such fingerprint defining is not performed beforehand, the secure sales and payment terminal (1) shall try to obtain the print information from the bank in order to match the print it has obtained from the fingerprint reader (22). The terminal will not be able to reach the fingerprint or face information that was supposed to be defined beforehand and shall submit a warning signal. In a negative scenario arising from the conditions of the environment or the user whose bank information is not defined, the secure sales and payment terminal (1) shall continue the payment transaction by requesting a standard pass code/pin from the customer.

Face recognition system and fingerprint methods are secure and fast payment methods. In the case that the customer does not want to use said methods they can transact their payments by using the standard payment methods of entering a pass code/pin code.

The bank/credit cards having contactless features can be read without physically contacting the terminal (1) by means of the contactless reader (16) located on the secure sales and payment terminal (1). The contactless card only provides ease of use and fast usage advantages compared to contact cards in the art.

A secure financial memory module (20) with a micro processor compliant to the financial cash register technical specification which safely stores the total daily sales, total VAT without them being able to be erased or changed, within the secure sales and payment terminal (1) is provided. The financial stamp screw (17) and the financial stamp screw slot (18) protect the secure structure herein. The financial stamp screw slot (18), fixes the financial stamp screw (17) onto the terminal (1). The financial stamp screw (17) is used in order to be able to check if the inside of the terminal has been opened by the authorized people or not, or to determine if it has been tampered with. If the financial stamp screw (17) is opened, this shall be understood and the authorized organizations can be inspected.

The secure sales and payment terminal (1), transfers information such as tax and shopping charges to the state organizations that are related to financial affairs, and the terminal application of business products (partial) and sales can be tracked. For example when a shop having an inventory of 1000 units, performs sales of 10 units; said shop shall notify this sale to the financial organizations and at the same time 10 units shall be deducted from the inventory in the accounting records of this shop. These records are used together with the software applications that have been developed (stock control). According to the preference of the customer the payment documents such as invoices or receipts can be sent to the e-mail address of the customer by the secure sales and payment terminal (1). By this means the paper roll (4) is not used and the environment is protected from excess paper usage. The charge module (25) located on the terminal (1) enables the charging of the terminal (1) without the need to attach a cable to the terminal (1) by using an external apparatus.

A secure financial memory card (20) is located on the terminal (1) wherein the financial information can be stored for an extended period of time.

Moreover by means of the internal EKU (21) or the external EKU (26) which are Electronic Record Units where the copies of all the transactions carried out on the terminal (1) are kept, control is provided by the authorized organizations. Such information can be sent to any necessary authority via any kind communication protocol.

The secure sales and payment terminal (1) communicates with the satellite via a GPS antenna (24) and the position of the terminal (1) can be determined. By this means, the place of payment can be tracked and the location of the user and the terminal (1) can also be traced by means of devices such as a computer or smart phone.

The invention claimed is:

1. A biometric secure sales and payment terminal using face recognition and fingerprint recognition, comprising: an electronic TFT screen which displays transactions carried out by a user,
   a customer screen where a customer can see information about expenses and costs,
   a paper roll on which a payment information of the customer is printed,
   a motherboard which arranges a system algorithm, stores the program as digital and analogue data, and compares a fingerprint and/or a face recognition data by communicating with a bank,
   a battery which enables the transactions to be carried out by providing power to the terminal when there is no mains electricity,
   a thermal printer which prints the information slips about sales, payment, report receipts on a paper roll,
   a speaker which enables the customer and the user to hear the transactions carried out,
   a card reader where a card contact is physically carried out and the card is magnetically read,
   a GSM antenna which carries out data flow with a base station, and enables the communication of the terminal with the necessary posts,
   a keyboard which enables the transactions to be carried out on the terminal by the user,
   a top cover which protects the terminal from impact that may be received from the top,
   a financial stamp screw which shows that access into the secure sales and payment terminal is performed by leaving a mark in the case that the secure sales and payment terminal is tampered,
   a financial stamp screw slot which enables the attachment of the financial stamp screw,
   a program which manages the communication between all the analogue and digital parts found inside the terminal and which is uploaded into a memory within the motherboard,
   an internal EKU which is an electronic record unit where all the copies of all transactions carried out on the secure sales and payment terminal are recorded therein,
   a chip card reader which is located on the secure sales and payment terminal and which can read the information of the customer loaded inside a chip found on the bank card,
   a GPS antenna which communicates with a satellite, and aids in determining the position of the secure sales and payment terminal,
   a camera located on the terminal, which captures a face image of the customer and submits face information to the motherboard so that the face information can be compared with the face data of the bank,
   a fingerprint reader, located on the terminal, which takes the fingerprint of the customer and submits fingerprint information to the motherboard so that the fingerprint is matched with the fingerprint information of the bank,
   a micro processor secure financial memory module which erases daily total sales and total VAT amount inside the secure sales and payment terminal and stores the daily total sales and the total VAT amount in a secure state which cannot be changed and which is in compliance with a financial cash register technical specification.

2. The biometric secure sales and payment terminal using face recognition and fingerprint recognition according to claim 1, wherein the secure sales and payment terminal further comprises a menu key that is used to reach desired options within the program, and a direction key which provides easy maneuvering within the menu key with which transactions can be carried out faster and easier.

3. The biometric secure sales and payment terminal using face recognition and fingerprint recognition according to claim 1, wherein the secure sales and payment terminal further comprises a contactless reader which reads cards having contactless characteristics.

4. The biometric secure sales and payment terminal using face recognition and fingerprint recognition according to claim 1, wherein the financial stamp screw shows that the terminal has been tampered with by leaving a mark inside the terminal if the terminal is opened.

5. The biometric secure sales and payment terminal using face recognition and fingerprint recognition according to claim 1, wherein the program is loaded into the memory within the motherboard and manages the communication between all of the analogue and digital parts within the secure sales and payment terminal.

6. The biometric secure sales and payment terminal using face recognition and fingerprint recognition according to claim 1, wherein the secure sales and payment terminal further comprises an external EKU located inside the top cover which is changed when the memory is full, into which all the copies of the printed information belonging to all transactions carried out by the secure sales and payment terminal are stored.

7. The biometric secure sales and payment terminal using face recognition and fingerprint recognition according to claim 1, wherein the fingerprint reader where the user moves between menus in a faster and easier way instead of using the menu key and a direction key, located on the secure sales and payment terminal which also recognizes the user.

8. The biometric secure sales and payment terminal using face recognition and fingerprint recognition according to claim 1, wherein a charger module enables the charging of the terminal by means of an external device, without a need for a cable to be attached to the terminal.

9. A biometric secure sales and payment terminal using face recognition and fingerprint recognition, comprising:
   an electronic TFT screen which displays transactions carried out by a user,
   a customer screen where a customer can see information about expenses and costs,
   a paper roll on which a payment information of the customer is printed,
   a motherboard which arranges a system algorithm, stores the program as digital and analogue data, and compares a fingerprint and/or a face recognition data by communicating with a bank, a battery which enables the transactions to be carried out by providing power to the terminal when there is no mains electricity, a thermal printer which prints the information slips about sales, payment, report receipts on a paper roll, a speaker which enables the customer and the user to hear the transactions carried out, a card reader where a card contact is physically carried out and the card is magnetically read, a camera located in the terminal, which captures the face image of the customer and submits the face information to the motherboard so that the face information can be compared with the face data of the bank, a GSM antenna which carries out data flow with a base station, and enables the communication of the terminal with the necessary posts, a keyboard which enables the transactions to be carried out on the terminal by the user, a top cover which protects the terminal from impact that may be received from the top, a contactless reader which can read the card having contactless characteristics, a financial stamp screw which shows that access into the secure sales and payment terminal is performed by leaving a mark in the case that the secure sales and payment terminal is tampered, a financial stamp screw slot which enables the attachment of the financial stamp screw, a program which manages the communication between all the analogue and digital parts found inside the terminal and which is uploaded into a memory within the motherboard, a micro processor secure financial memory module which erases daily total sales and total VAT amount inside the secure sales and payment terminal and stores the daily total sales and the total VAT amount in a secure state which cannot be changed and which is in compliance with a financial cash register technical specification, an internal EKU which is an electronic record unit where all the copies of all transactions carried out on the secure sales and payment terminal are recorded therein, a chip card reader which is located on the secure sales and payment terminal and which can read the information of the customer loaded inside a chip found on the bank card, a GPS antenna which communicates with a satellite, and aids in determining the position of the secure sales and payment terminal, a charger module which enables the charging of the terminal by means of an external device, without the need for a cable to be attached to the secure sales and payment terminal, and an external EKU located inside the top cover which can be changed when the memory is full, into which all the copies of printed information belonging to all the transactions carried out by the secure sales and payment terminal are stored, a fingerprint reader, located on the terminal, which takes the fingerprint of the customer and submits fingerprint information to the motherboard so that the fingerprint is matched with the fingerprint information of the bank.

\* \* \* \* \*